Feb. 9, 1943.   M. A. BOSTWICK   2,310,832
NETWORK DISTRIBUTION SYSTEM
Filed Jan. 10, 1940   2 Sheets-Sheet 1

WITNESSES:

INVENTOR
Myron A. Bostwick.
BY
ATTORNEY

Feb. 9, 1943.  M. A. BOSTWICK  2,310,832
NETWORK DISTRIBUTION SYSTEM
Filed Jan. 10, 1940  2 Sheets-Sheet 2

WITNESSES:

INVENTOR
Myron A. Bostwick.
BY
ATTORNEY

Patented Feb. 9, 1943

2,310,832

UNITED STATES PATENT OFFICE 2,310,832

NETWORK DISTRIBUTION SYSTEM

Myron A. Bostwick, Budd Lake, N. J., assignor to Westinghouse Electric & Manufacturing Company, East Pittsburgh, Pa., a corporation of Pennsylvania Application January 10, 1940, Serial No. 313,253

19 Claims. (Cl. 175—294)

This invention relates to electrical protective apparatus and it has particular relation to automatic protectors for electrical network distribution systems.

For urban areas having high load densities and for other areas having moderate load densities, it is the practice to employ network distribution systems. Such a system includes a network circuit or grid which is fed by a plurality of feeder circuits connected to one or more station buses or sources of alternating current. Each feeder circuit is connected to the network circuit through a network transformer and a network protector. The network protector is automatic in operation and serves to connect a feeder to the network circuit when the polarity, phase rotation and voltage of the feeder assure a transfer of power from the feeder to the network circuit. The protector usually serves to disconnect the feeder from the network circuit when the flow of power reverses. Such a reversal of power may result from a fault on the feeder or from the flow of magnetizing current from the network circuit to a network transformer when a feeder is disconnected from its station bus or source of alternating current.

It is common practice to provide network protectors with extremely sensitive settings. For example, a network protector may be set to connect a feeder to a network circuit when the feeder voltage at the network protector exceeds the in-phase network circuit voltage by one-half a volt. Moreover the network protector may be set to trip when the reverse power from the network circuit exceeds .2 of 1% of the network protector rating.

With such sensitive settings, network protectors are subject to frequent unnecessary operations. Certain of these unnecessary operations may be eliminated by means of a phasing relay which is often employed in the art to insure proper phase relationships between network and feeder voltages before closure of the network protector is permitted. However, still other unnecessary network protector operations are encountered which are not eliminated by such apparatus.

As an example of a network circuit subject to additional unnecessary circuit operations, reference may be made to a moderately loaded network circuit which is subject to temporary load disturbances. Specifically such load disturbances may be encountered in a network circuit which supplies electrical energy to an elevator motor. Each operation of an elevator motor results in a comparatively heavy drain on the network circuit and a resultant lowering in the voltage thereof. If a feeder circuit should happen to be disconnected from the network circuit because the feeder voltage is slightly lower than the network circuit voltage, the lowering of the network circuit voltage when the elevator motor starts may be sufficient to effect a closure of the feeder network protector. When the load disturbance caused by the elevator motor disappears, the voltage conditions on the network circuit and the feeder circuit are restored and the network protector trips out to disconnect the feeder circuit. Consequently, an unnecessary operation of the network protector has resulted.

That these problems are of great importance in practice may be inferred from a specific case in which the network protector was found to operate in the neighborhood of 600 times per month, most of these operations being caused by load disturbances and being unnecessary. By the application of the principles of my invention, operations of such a network protector may be reduced to approximately six operations per month with substantially no impairment in service.

In accordance with my invention, a network protector is provided with a time delay between the operation of its relay closing means and the operation of the network circuit breaker. Preferably this time delay is provided by a thermal timing element which passes through a timing cycle comprising a heating period and a cooling period. Such a cycle results in an increased stability and consistency of operation of the timing element.

The time for which the timing element is set may vary in accordance with the nature of the load on the network circuit associated therewith and the characteristics of the network system. Practically all load disturbances of the type here considered last for more than two seconds. Most of them have a duration of less than one minute, although some are still longer. Consequently, if a load disturbance disappears before the expiration of the time limit for which a protector is set, the protector will fail to close and an unnecessary operation thereof will be eliminated. As a specific example, a time delay of four minutes is suitable for certain network circuits.

When a network circuit or grid is dead or de-energized, operation of the time element is unnecessary for the reason that a reversal of power flow can not take place. For this condition, I may provide a voltage responsive relay energized from the network circuit for by-passing the timing element when the network circuit is deenergized. With this addition, a network protector closes promptly on a dead network circuit whenever a feeder is properly energized.

In a further aspect of my invention, a network protector is provided with a time delay effective for both tripping and closing operations of the network protector.

It is, therefore, an object of my invention to provide a network protector having means for restricting unnecessary operations thereof.

It is a further object of my invention to provide a network protector, having a relay for controlling the closure thereof, with a timing element effective after the closure of the relay contacts for retarding the closure of the protector.

It is a further object of my invention to provide a network protector with a delay on reclosing sufficient to permit the disappearance of load disturbances commonly encountered on the network circuit associated therewith.

It is a still further object of my invention to provide a network protector requiring a greater time for closure on an energized network circuit than on a deenergized network circuit.

Still another object of my invention is to provide a network protector with a time delay on both closing and tripping operations.

Other objects of my invention will be apparent from the following description taken in conjunction with the accompanying drawings, in which Figure 1 is a single line diagrammatic view of a distribution network circuit;

Figure 1:
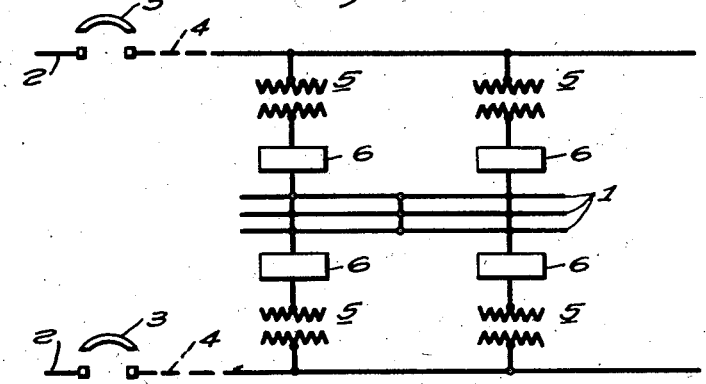

Referring to the drawings, Figure 1 shows a network circuit or grid 1, which is energized from one or more sources 2 of alternating current through feeder circuit breakers 3 and feeder circuits 4. The sources 2 may be station buses or other alternating current sources. Each of the feeder circuits 4 is connected to the network circuit or grid 1 through one or more network transformers 5 and network protectors 6. Although only two feeder circuits 4 are illustrated in Fig. 1, it is to be understood that as many feeder circuits as desired may be employed for supplying energy to the network circuit 1. Similarly, the number of network protectors and network transformers may be varied.

Figure 2:
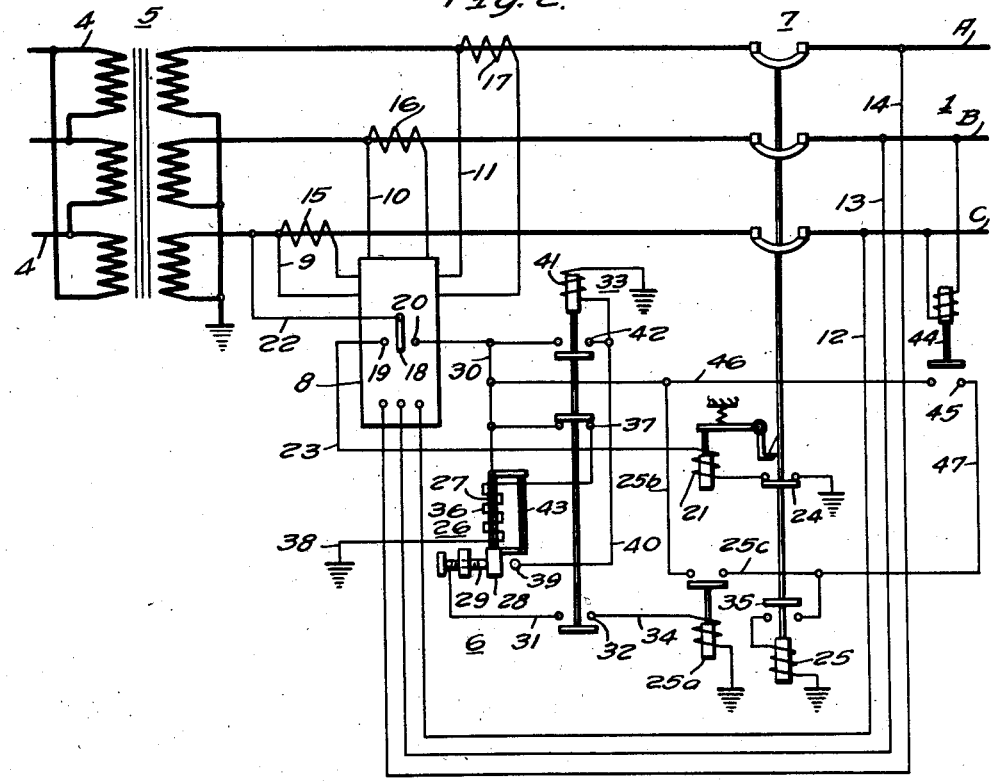
Fig. 2 is a diagrammatic view of a network protector embodying my invention.

In Fig. 2, I have illustrated in detail one of the network protectors of Fig. 1. The network circuit 1 in Fig. 2 is illustrated as a polyphase or three-phase network circuit having three phase-conductors A, B and C. These phase conductors are connected to the secondary windings of one of the transformers 5 through a network circuit breaker 7. The windings of the transformer 5 may be connected in various ways but for purposes of illustration I have illustrated a star-connected secondary winding which may be energized from a delta-connected primary winding.

For controlling the operation of the circuit breaker 7, a suitable relay unit 8 is connected to the network system through two groups of potential conductors, one group comprising conductors 9, 10 and 11 is connected on the transformer side of the circuit breaker, whereas a second group comprising the conductors 12, 13 and 14 is connected on the network circuit side of the circuit breaker. In addition, current transformers 15, 16 and 17 are provided for energizing the relay 8 in accordance with currents flowing through the phase conductors A, B and C.

The relay unit 8 may vary appreciably in its construction. In general, the relay includes a master relay having watt and phasing windings. The watt windings are designed to operate a movable contact 18 into engagement with a tripping contact 19 when power flows from the network circuit 1 to the feeder associated with the transformer 5 of Fig. 2 due to a fault occurring on the feeder circuit. The contacts 18 and 19 also engage in response to a flow of magnetizing current from the network circuit 1 to the transformer 5 which may occur when the feeder circuit associated with the transformer is disconnected from its source.

When the circuit breaker 7 is open, the phasing windings present in the master relay serve to compare the voltages across the contacts of the circuit breaker, and to move the movable contact 18 into engagement with a closing contact 20 when the relationship of the voltages is such that power will flow from the transformer 5 to the network circuit 1 following the closure of the circuit breaker. In some cases the relay unit 8 may also include a phasing relay for preventing closure of the circuit breaker 7 when phase conditions across its contacts are such that pumping of the circuit breaker would result. Typical constructions for the relay unit 8 are illustrated in greater detail in the Parsons Patents Nos. 1,997,697 and 2,013,836, to which reference may be made for further information thereon.

A tripping solenoid 21 is provided for the network circuit breaker 7. When the movable contact 18 of the relay unit 8 engages the tripping contact, a tripping circuit is completed for the solenoid 21 from the phase conductor C through a conductor 22, the movable contact 18, the tripping contact 19, a conductor 23, the tripping solenoid 21, and a pallet switch 24 on the circuit breaker to ground. Consequently, an engagement of the movable contact 18 with the tripping contact 19 results in the tripping of the network circuit breaker 7 to disconnect the network circuit from the transformer 5.

When the movable contact 18 engages the closing contact 20, a circuit is established for initiating closure of the circuit breaker 7 which is provided with a closing solenoid 25.

An auxiliary closing relay 25a is provided for controlling the closing solenoid 25. Assuming that the movable contact 18 engages the closing contact 20 and that the front contacts of the auxiliary relay 25a are closed, a closing circuit for the closing solenoid 25 is established from the phase conductor C through the conductor 22, the contacts 18, 20, conductors 30 and 25b, the front contacts of the relay 25a, a conductor 25c, a pallet switch 35 and the solenoid 25 to ground.

As above indicated, it is desirable that a time delay be interposed between the closure of the contacts 18 and 20 and the closure of the network circuit breaker 7 in order to preclude unnecessary operations of the network circuit breaker 7. For this reason, a timing relay unit 26 is introduced into the closing circuit of the circuit breaker 7. This timing relay unit may be constructed in a number of different ways but in a preferred embodiment of my invention, it comprises a thermal timing element 27 having a movable contact 28 and an adjustable cold contact 29.

When the relay unit 8 and the timing relay unit 26 are in condition for closing the network circuit breaker 7, a circuit is established for the closing relay 25a from the phase conductor C through the conductor 22, the movable contact 18, the closing contact 20, the conductor 30, the movable contact 28, the cold contact 29, a conductor 31, front contacts 32 of an auxiliary relay 33, a conductor 34, and the closing relay 25a to ground. It will be noted that closures of two sets of contacts are necessary in order to complete a closing circuit between the relay unit 8 and the relay 25a, namely, the contacts 28, 29 and the front contacts 32. The conditions under which both of these sets of contacts are closed now will be described.

The thermal timing element 27 may be constructed in various ways but, as illustrated, it comprises a bimetallic operating arm for the movable contact 28. This arm is heated by a resistance heater 36. When the movable contact 18 engages the closing contact 20 of the relay unit 8, a circuit is established for the heater from the phase conductor C through the conductor 22, the movable contact 18, the closing contact 20, the conductor 30, a pair of back contacts 37 on the relay 33, the resistance heater 36 and the conductor 38 to ground. As the thermal timing element heats, the movable contact 28 moves away from the cold contact 29 towards a hot contact 39.

Although contact between the movable contact 28 and the hot contact 39 alone may be relied on for energizing the closing relay 25a, preferably the timing element 27 is forced to go through not only a heating period but a cooling period before the energization of the closing solenoid 25. This results in a timing element operation which is considerably more consistent and stable than that otherwise obtainable. To this end, the hot contact 39 is connected through a conductor 40 to the coil 41 of the auxiliary relay 33. When the movable contact 28 of the thermal timing element engages the hot contact 39, a circuit is established for the coil 41 from the phase conductor C through the conductor 22, the movable contact 18, the fixed contact 20, the conductor 30, the movable contact 28, the hot contact 39, the conductor 40 and the coil 41 to ground. In response to the energization of its coil, the relay 33 operates to close a pair of contacts 42 in order to establish a holding circuit for itself. At the same time, operation of the relay 33 opens the contacts 37, thereby interrupting the circuit for the heater 36. Operation of the relay 33 also closes the contacts 32, but since the contacts 28 and 29 are open at this time, the circuit for the closing solenoid is incomplete.

Since the circuit for the heater 36 is interrupted, the timing element 27 starts to cool, and as it cools, the movable contact 28 moves away from the hot contact 39 into engagement with the cold contact 29. After the lapse of a time sufficient for the movable contact 28 to complete its travel, the contacts 28 and 29 engage and complete a closing circuit for the closing relay 25a. Consequently, the network circuit breaker 7 closes after the lapse of a time sufficient for the timing element 27 in heating to carry the movable contact 28 into engagement with the hot contact 39 plus a time sufficient for the timing element 27 in cooling to return the movable contact 28 into engagement with the cold contact 29.

Under repeated intermittent engagements of the contacts 18 and 20 of the relay unit 8, the successive heatings of the thermal timing element 27 tend to carry it away from the cold contact 29. Because of the successive contacts, the movable contact 28 of the thermal timing element may be carried to a position almost in contact with the hot contact 39. At this stage, a short additional engagement of the contacts 18 and 20 would be sufficient to complete the travel of the movable contact 28 into engagement with the fixed contact 39 despite the fact that the additional engagement of the contacts 18 and 20 may be occasioned by a temporary load disturbance on the network circuit 1. If only the heating cycle of the thermal timing element 27 were utilized for completing a closing circuit for the closing solenoid 25, the circuit breaker 7 would be closed in response to the temporary load disturbance and an unnecessary operation thereof would result.

By employing a timing cycle requiring both the heating and the cooling of the thermal timing element 27, such an operation is prevented for the reason that a complete travel of the movable contact 28 from engagement with the hot contact 39 into re-engagement with the cold contact 29 is required before the closing solenoid 25 can be actuated. During the cooling interval, the timing element is not affected by temporary load disturbances on the network circuit 1. The cooling interval may be an appreciable portion of the timing cycle of the thermal timing element 27.

If the contacts 18 and 20 of the relay unit 8 should separate while the thermal timing element 27 is heating, the circuit for the heater would be interrupted and no operation of the circuit breaker 7 would result. That is, the parts would return to the positions indicated in Fig. 2. Since the contacts 32 remain open during the entire heating interval, no operation of the closing solenoid 25 can take place. If the contacts 18 and 20 separate during the cooling interval of the timing element 27, the holding circuit for the relay 33 is interrupted and the relay returns to the position indicated in Fig. 2. Consequently in either case a false operation of the circuit breaker 7 can not occur.

The thermal timing element 27 may be compensated for errors due to ambient temperature in any conventional manner. As illustrated, when the thermal timing element 27 is a bimetallic element, a second similar bimetallic element 43 may be provided for opposing movements of the thermal timing element 27. The second bimetallic element 43 is not subjected to the heat produced by the heater 36 but is heated only by the ambient temperature.

It will be noted that the mechanism thus far described imposes an appreciable time delay between engagement of the contacts 18 and 20 of the relay unit 8 and closure of the circuit breaker 7. When the network circuit 1 is dead or deenergized, such a time delay is unnecessary. Under such circumstances, prompt reclosure of the network circuit breaker 7 may be provided by a voltage relay 44 having back contacts 45 connected for by-passing the timing relay unit 26. When the network circuit 1 is deenergized, a circuit is established for the closing solenoid 25 from the closing contact 20 through the conductor 30, a conductor 46, the back contacts 45, a conductor 47, the pallet switch 35, and the closing solenoid 25 to ground. The voltage relay 44 is connected across two phase conductors of the network circuit 1 and is responsive to the voltage between these two conductors.

In operation, assuming the circuit breaker 7 to be closed, if a fault should occur on the feeder supplying the transformer 5 or if the feeder should be dead, the resulting reversal of power results in an actuation of the movable contact 18 of the relay unit 8 into engagement with the tripping contact 19. This establishes a circuit for the tripping solenoid 21, and the circuit breaker 7 consequently opens to disconnect the feeder from the network circuit. As the circuit breaker opens, the pallet switch 24 opens to interrupt the tripping circuit and the pallet switch 35 closes to prepare the closing solenoid 25 for a closing operation.

When the voltage conditions across the contacts of the circuit breaker 7 become such that a flow of power from the transformer 5 to the network circuit 1 is assured, the phase winding of the relay unit 8 actuates the movable contact 18 into engagement with the closing contact 20. Assuming that the network circuit 1 is energized, the back contacts 45 of the relay 44 will be open and closure of the circuit breaker 7 must take place through the timing relay unit 26. Consequently, the engagement of the contacts 18 and 20 starts a heating and cooling cycle for the thermal timing element 27.

As the thermal timing element 27 heats, the movable contact 28 moves into engagement with the hot contact 30 to actuate the relay 33. Actuation of the relay 33 interrupts the heating circuit for the heater 36 and closes the contacts 32. Since the heater no longer is energized, the thermal timing element 27 starts to cool, and as it cools the movable contact 28 moves away from the hot contact 30.

In the event that the voltage conditions across the contacts of the circuit breaker 7 are caused by a temporary load disturbance having a duration less than the timing cycle of the timing relay unit 26, the load disturbance disappears before the movable contact 28 reaches the cold contact 29. When the temporary load disturbance disappears the movable contact 18 is moved away from the closing contact 20, thereby preventing the energization of the closing solenoid 25. Under these conditions, no operation of the circuit breaker 7 results.

However, if the engagement of the movable contact 18 with the closing contact 20 of the relay unit 8 is in response to a stable load condition, the timing cycle continues until the movable contact 28 re-engages the cold contact 29. At this time a circuit is completed for the closing solenoid 25 through the closing relay 25a, and the circuit breaker closes to connect the network circuit 1 to the transformer 5.

Assuming now that at the time the movable contact 18 engages the closing contact 20, the network circuit 1 is deenergized, it follows that the contacts 45 of the voltage relay 44 are closed. Consequently, at the instant the contacts 18 and 20 engage, a circuit is established for the closing solenoid 25 through the contacts 45, and the circuit breaker 7 promptly closes.

A variation of the timing cycle may be effected by proper adjustment of the adjustable cold contact 29.

It will be noted that the inclusion of the timing relay unit 26 does not affect the operation of the relay unit 8 appreciably. Thus tripping of the circuit breaker 7 is accomplished promptly when the contacts 18 and 19 engage. Moreover, the sensitivity of the relay unit 8 in the closing direction is substantially unchanged. Timing is introduced only after engagement of the contacts 18 and 20.

Figure 3:
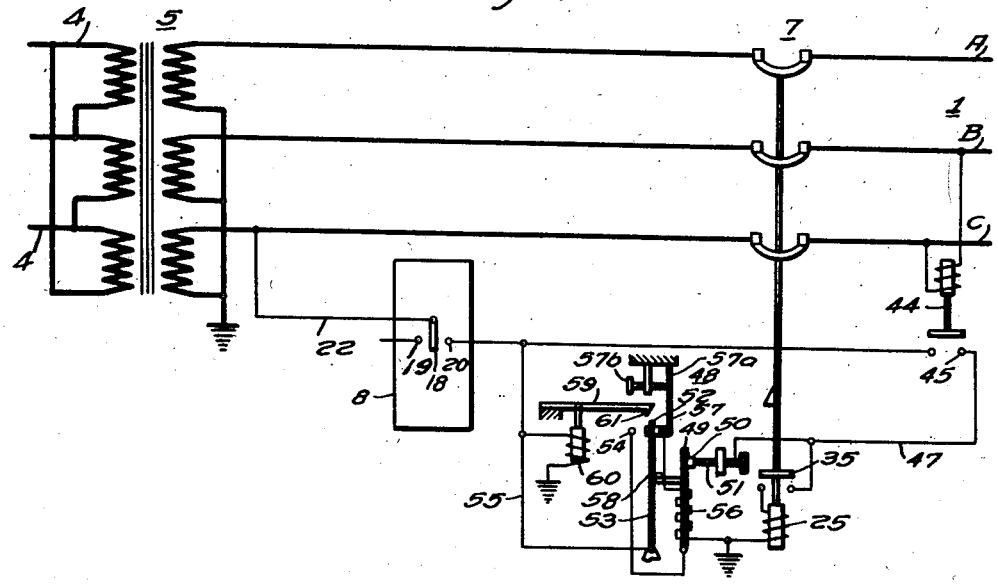
Fig. 3 is a diagrammatic view of a network protector embodying a modified form of my invention.

In Fig. 3, I have illustrated a network protector embodying a modified timing relay unit. The transformer 5, circuit breaker 7 and relay unit 8 of Fig. 3 are similar to those illustrated in Fig. 2 but, for simplicity, the connections of the relay unit 8 to the network circuit and the tripping circuit for the circuit breaker 7 are omitted.

The timing relay unit 48 of Fig. 3 includes a thermal timing element 49 which may be similar to the timing element 27 of Fig. 2. Although no ambient temperature compensation is illustrated for the thermal timing element 49, it is to be understood that such compensation may be provided, if desired. The thermal timing element 49 is provided with a movable contact 50 which normally is in engagement with an adjustable cold contact 51. In order to complete a closing circuit for the closing solenoid 25, not only must the contacts 50 and 51 be in engagement, but a movable contact 52, which is mounted on the free end of a cantilever spring 53, must be in engagement with a control contact 54. That is, these two pairs of contacts are connected in series. When both pairs are closed, a circuit is established for the closing solenoid 25 from the phase conductor C through the conductor 22, the movable contact 18, the closing contact 20, a conductor 55, the spring 53, the movable contact 52, the control contact 54, the thermal timing element 49, the movable contact 50, the cold contact 51, the pallet switch 35 and the closing solenoid 25 to ground. The conditions under which both pairs of contacts are in engagement now will be set forth.

When the movable contact 18 engages the closing contact 20 of the relay 8, a circuit is established for a heater 56 provided for the thermal timing element 49. This circuit may be traced from the phase conductor C through the conductor 22, the movable contact 18, closing contact 20, the conductor 55, the spring 53, a heater contact 57, against which the spring 53 normally is biased, and the heater 56 to ground. As the thermal timing element 49 heats, it moves away from the cold contact 51, and in so moving it operates through a connecting pin 58 to displace the spring 53 and the contact 52 carried thereby from engagement with the heater contact 57 into engagement with the control contact 54. Although this movement brings the contacts 52 and 54 into engagement, no operation of the closing solenoid 25 can take place for the reason that the contacts 50 and 51 are separated. The pin may be carried by either the thermal timing element 49 or the spring 53.

When the movable contact 52 is moved into engagement with the control contact 54, the energizing circuit for the heater 56 is interrupted at the heater contact 57. Consequently, the thermal timing element 49 starts to cool. In order to prevent the spring 53 from following the thermal timing element 49 as it cools, a spring latch 59 is provided for holding the spring 53 with its movable contact 52 in engagement with the control contact 54.

Normally, the spring 59 is biased slightly out of the path of travel of the cantilever spring 53. When the movable contact 18 engages the closing contact 20 of the relay unit 8, however, a circuit is established for a solenoid 60 which depresses the latch 59 into the path of travel of the cantilever spring 53. As the spring 53 moves to the left during the heating period of the thermal timing element 37, it engages an inclined surface on the latch 59 and raises the latch until the cantilever spring 53 slips behind a lug 61 provided on the latch. At this time, the movable contact 52 has disengaged the heater contact 57 and engaged the control contact 54, the last part of the movement of the spring 53 resulting from the stored heat in the thermal timing element assembly. Preferably the heater contact 57 is mounted on a spring 57a, and is biased to follow the movable contact 52 until the spring 57a engages an adjustable stop 57b.

As the thermal timing element 49 cools, the cantilever spring 53 is prevented from following the timing element because of its engagement with the lug 61 on the latch 59. The thermal timing element continues to cool until the contact 50, which it carries, engages the cold contact 51. At this time, the energizing circuit for the closing solenoid 25 is completed and the circuit breaker 7 is actuated into its closed condition.

If the contacts 18 and 20 separate while the thermal timing element 49 is heating, the heating circuit for the timing element is interrupted by separation of these contacts and the parts of the timing relay unit return to the positions indicated in Fig. 3 without effecting a closing operation of the circuit breaker 7. If the contacts 18 and 20 separate during a cooling period of the thermal timing element 49, the solenoid 60 is deenergized and the latch 59 rises by spring action to release the cantilever spring 53. This cantilever spring then returns into engagement with the heater contact 57 in readiness for a succeeding operation.

The operation of the voltage relay 44 in Fig. 3 is similar to its operation in Fig. 2. That is, the voltage relay 44 by-passes the timing relay unit 48 when the network circuit 1 is deenergized. This permits a prompt reclosure of the circuit breaker 7 on a dead network circuit.

In order to decrease the severity of the burden on the contacts 50 and 51, a relay similar to the relay 25a of Fig. 1 may be interposed between these contacts and the closing solenoid. It is believed that this construction is clear from its illustration in Fig. 2.

In the modifications illustrated in Figs. 2 and 3, a timing relay unit is employed for introducing a time delay only in the closing operation of the circuit breaker. By proper rearrangement of circuits, the same timing relay unit may be employed for introducing a time delay not only in the closing operation but in the tripping operation of the circuit breaker 7. Such a re-arrangement is desirable on certain network distribution systems which, because of load disturbances and circuit characteristics, are subject not only to circuit breaker closing impulses of short duration, but to circuit breaker tripping impulses of short duration.

Figure 4:
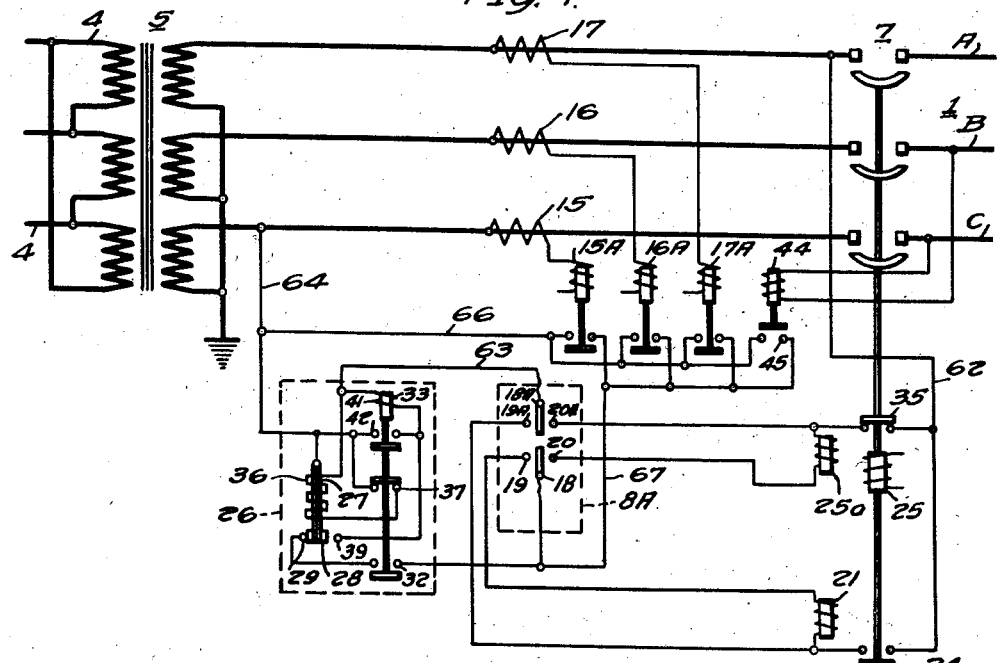
Fig. 4 is a diagrammatic view of a network protector embodying a still further modified form of my invention.

In Fig. 4, the timing relay unit 26 described with reference to Fig. 2, is associated with a relay unit 8A. The relay unit 8A is similar to the relay unit 8 of Figs. 2 and 3 but is provided, in addition, with an auxiliary tripping contact 19A, an auxiliary closing contact 20A and an auxiliary movable contact 18A. The movable contact 18A is insulated from the movable contact 18 but is disposed for movement therewith. The purpose of these auxiliary contacts will be set forth below. Although the energization of the relay unit 8A is not illustrated in full, it is to be understood that its energization is similar to that of the relay unit 8 illustrated in Fig. 2, the energizing current transformers 15, 16 and 17 also being illustrated in Fig. 4.

Energization of the resistance heater 36 of the timing relay unit is effected through either of the auxiliary contacts 19A and 20A. When the relay unit 8A is in circuit breaker closing condition, the movable contacts 18 and 18A are in engagement respectively, with the closing contacts 20 and 20A. Under these circumstances, an energizing circuit for the resistance heater 36 is established from the phase conductor A through a conductor 62, the pallet switch 35, the auxiliary closing contact 20A, the movable contact 18A, a conductor 63, the resistance heater 36, the back contacts 37 of the auxiliary relay 33, and a conductor 64 to the phase conductor C.

In response to this energization, the timing relay unit starts its timing cycle as above described, and continues until the front contacts 32 of the auxiliary relay 33 are closed and the cold contact 29 is again re-engaged by the movable contact 28. At this time, a closing circuit is established for the auxiliary relay 25a which controls the closing of the circuit breaker 7. This circuit may be traced from the phase conductor A through the conductor 62, the pallet switch 35, the auxiliary relay 25a, the closing contact 20, the movable contact 18, the front contacts 32, the cold contact 29, the movable contact 28, and the conductor 64 to the phase conductor C. Consequently, the circuit breaker 7 will close after the expiration of the time interval for which the timing relay unit 26 is set.

If the relay unit 8A is in circuit breaker tripping condition, the movable contacts 18 and 18A are in engagement respectively with the tripping contacts 19 and 19A. Under these conditions, an energizing circuit for the resistance heater 36 is established from the phase conductor A through the conductor 62, the pallet switch 24, the auxiliary tripping contact 19A, the movable contact 18A, the conductor 63, the resistance heater 36, the back contacts 37 and the conductor 64 to the phase conductor C. This starts the timing relay unit 26 on a timing cycle. At the end of the cycle, a tripping circuit is established for the tripping solenoid 21 which may be traced from the phase conductor 64, through the movable contact 28, the cold contact 29, the front contacts 32, the movable contact 18, the tripping contact 19, the solenoid 21, the pallet switch 24, and the conductor 62 to the phase conductor A. Consequently, at the end of the timing cycle, the circuit breaker 7 is tripped.

If the auxiliary relay 25a and the solenoid 21 are too insensitive to respond to the current taken by the resistance heater 36, the auxiliary contacts 18A, 19A and 20A may be omitted and the conductor 63 connected directly between the timing relay unit 26 and the movable contact 18. However, in order to render the description more complete, I have illustrated a circuit capable of segregating the heating current and the energizing currents for the auxiliary relay 25a and the solenoid 21.

In the circuit thus far described, a time delay is introduced for all tripping operations. When a fault occurs on the feeder circuit 4, such a time delay usually would prove objectionable. For this reason, I provide a plurality of bypass relays 15A, 16A and 17A for bypassing the timing relay unit 26. As illustrated, these bypass relays have front contacts connected in parallel across the timing relay unit through conductors 66 and 67. Each bypass relay is connected for energization in accordance with the current passing through a separate phase conductor. Such energization may be provided readily by placing the energizing windings of the bypass relays in series with the same current transformers 15, 16 and 17 employed for energizing the current coils of the relay unit 8A. Consequently, if the relay unit 8A is in tripping condition and the current passing through any one of the phase conductors A, B and C is in excess of the current setting for the corresponding bypass relay, the bypass relay will operate to establish a bypass circuit around the timing relay unit 26 and the circuit breaker 7 will trip out promptly. The settings of the bypass relays will be dictated by the particular conditions of the network distribution system to be protected. For example, each of the bypass relays may be set to pick up and close its contacts when the current in the appropriate phase conductor reaches its full load value.

In order to permit a prompt reclosure of the circuit breaker 7 on a dead network 1, the voltage relay 44 is employed for establishing a bypass circuit around the timing relay unit 26. To this end the contacts of the voltage relay 44 may be placed in parallel with the contacts of the bypass relays 15A, 16A and 17A.

The operation of the complete system illustrated in Fig. 4 now may be set forth. Assuming that the circuit breaker 7 is open, if a closing impulse should be applied to the relay unit 8A, the movable contacts 18 and 18A would be moved into engagement with the closing contacts 20 and 20A. Consequently, the resistance heater 36 of the timing relay unit 26 would be energized, and the timing relay unit would start a timing cycle.

For closing impulses of short duration, the impulse disappears before the completion of the timing cycle and the circuit breaker 7 would fail to close. Should the closing impulse persist for the duration of the timing cycle, the timing relay unit would close its contacts 28, 29 and 32 to complete a closing circuit for the circuit breaker 7.

If the network circuit 1 happens to be deenergized or dead at the time the closing impulse is applied to the relay unit 8A, the voltage relay 44 is in its contact closing position and bypasses the timing relay unit 26. Therefore, the circuit breaker 7 closes promptly on the deenergized network circuit.

Assuming that the network circuit breaker 7 is in its closed condition, if a tripping impulse is applied to the relay unit 8A, the movable contacts 18 and 18A are actuated into engagement with the tripping contacts 19 and 19A. This starts a timing cycle of the timing relay unit 26. Should the tripping impulse be of short duration, it would disappear before completion of the timing cycle, and the circuit breaker 7 would fail to trip.

If the tripping impulse persists for the duration of the timing cycle, the timing relay unit 26 closes the necessary contacts to complete an energizing circuit for the tripping solenoid 21, and the circuit breaker 7 is tripped.

If the tripping impulse is accompanied by an excessive flow of current through one or more of the phase conductors A, B and C, at least one of the bypass relays 15A, 16A or 17A is actuated to bypass the timing relay unit 26. Consequently, the circuit breaker 7 is tripped promptly.

It should be noted that although the circuit breaker 7 does not trip for weak tripping impulses of short duration, it can be adjusted to respond to the flow of magnetizing current from the network circuit 1 to the transformer 5. That is, when the feeder circuit breaker is opened to deenergize the feeder circuit 4, the network circuit 1 supplies magnetizing current to the transformer 5. If the relay unit 8A is sensitive to the small magnetizing current, the circuit breaker 7 is tripped at the end of the timing interval for which the timing relay unit 26 is set.

Since my invention is susceptible to numerous modifications, I do not wish my invention to be restricted except as required by the appended claims when interpreted in view of the prior art.

I claim as my invention:

1. In an electrical network distribution system, a feeder circuit, a network transformer having a primary winding connected for energization from said feeder circuit and having a secondary winding, a network circuit connected for energization directly from said secondary winding, a circuit breaker for controlling the connection of said network circuit to said secondary winding, means responsive to the direction of power flow between said feeder and network circuit for tripping said circuit breaker, control means including a pair of contacts, said control means being responsive to a predetermined condition of said network distribution system for closing said contacts to initiate a closure of said circuit breaker, and means effective only if said predetermined condition persists over a time interval measured from the closure of said contacts for closing said circuit breaker, said time interval being in excess of ten seconds.

2. In an electrical network distribution system, a feeder circuit, a network transformer having a primary winding connected for energization from said feeder circuit and having a secondary winding, a network circuit connected for energization directly from said secondary winding, a circuit breaker for controlling the connection of said network circuit to said secondary winding, and operating means for said circuit breaker for tripping said circuit breaker in response to a reversal of power flow through said transformer and for closing said circuit breaker when said feeder circuit is in condition for supplying power to said network circuit, said operating means being adjusted for tripping said circuit breaker in response to a flow of magnetizing current from said network circuit to said transformer, and being adjusted for closing said circuit breaker only a predetermined time after the establishment and maintenance of a proper operating condition of said feeder and network circuits, said predetermined time being at least ten seconds to permit customary brief load disturbances in said network distribution system to disappear.

3. In an electrical network distribution system, a feeder circuit, a network transformer having a primary winding connected for energization from said feeder circuit and having a secondary winding, a network circuit connected for energization directly from said secondary winding, a circuit breaker for controlling the connection of said network circuit to said secondary winding, and means for closing said circuit breaker when said network circuit is either energized or deenergized, said closing means operating with greater delay when said network circuit is energized than when said network circuit is deenergized.

4. In an electrical network distribution system, a feeder circuit, a network transformer having a primary winding connected for energization from said feeder circuit and having a secondary winding, a network circuit connected for energization directly from said secondary winding, a circuit breaker for controlling the connection of said network circuit to said secondary winding, means responsive to the direction of power flow between said feeder and network circuits for tripping said circuit breaker, and closing means for said circuit breaker, said closing means being effective when said feeder circuit is properly energized and said network circuit is deenergized for promptly closing said circuit breaker, and said closing means being effective when said feeder circuit is properly energized and said network circuit is energized for closing said circuit breaker only after the expiration of a time delay sufficient for permitting brief load disturbances in said network distribution system to disappear, said time delay being at least ten seconds.

5. In an electrical network distribution system; a feeder circuit; a transformer connected for energization from said feeder circuit; a network circuit; a circuit breaker for connecting said network circuit to said transformer; and means for operating said circuit breaker including a thermal timing element, means responsive to a condition of said network distribution system for actuating said timing element through a heating and cooling cycle, means for initiating a closing operation of said circuit breaker, and means responsive to said initiating means only after an initiation and completion of said cycle for closing said circuit breaker.

6. In an electrical network distribution system; a feeder circuit; a transformer connected for energization from said feeder circuit; a network circuit; a circuit breaker for connecting said network circuit to said transformer; and means for operating said circuit breaker including a thermal timing element, means responsive to a condition of said network distribution system for actuating said timing element through a heating and cooling cycle, means responsive to a completion of said cycle for closing said circuit breaker, and means responsive to the condition of energization of said network circuit for effecting the closure of said circuit breaker before completion of said cycle.

7. In an electrical network distribution system; a feeder circuit; a transformer connected for energization from said feeder circuit; a network circuit; a circuit breaker for connecting said network circuit to said transformer; and means for operating said circuit breaker including a thermal timing element, a first pair of contacts closed when said thermal timing element is in a predetermined condition, a second pair of contacts closed in response to departure of said thermal timing element from said predetermined condition, and means responsive only to the series condition of said pairs of contacts for closing said circuit breaker.

8. In an electrical network distribution system, a feeder circuit, a network circuit, a circuit breaker for connecting said feeder and network circuits, and means for operating said circuit breaker including a thermal element, means for energizing said thermal element in accordance with a condition of said network distribution system, first contact means controlled by a first temperature condition of said thermal element, second contact means controlled by a second temperature condition of said thermal element, holding means for retaining said second contact means in a condition corresponding to said second temperature condition of said thermal element while said thermal element returns to said first temperature condition, and circuit breaker closing means responsive to the condition of said first and second contact means.

9. In an electrical network distribution system, a feeder circuit, a network circuit, a circuit breaker for connecting said feeder and network circuits, and means for operating said circuit breaker including a contact-making thermal element, means for energizing said thermal element in accordance with a condition of said network distribution system, said thermal element being movable between a first and a second contact making position in accordance with its energization, relay means having contact means in series with the contacts made by said thermal element in said first contact making position, said relay being connected for actuation when said thermal element is in its second contact making position, means for holding said relay in the position to which it is actuated, and circuit breaker closing means responsive to the condition of said series-connected contact means and contacts.

10. In an electrical network distribution system, a feeder circuit, a network circuit, a circuit breaker for connecting said feeder and network circuits, and means for operating said circuit breaker including a thermal element movable between a first position and a second position, means for energizing said thermal element in accordance with a condition of said network distribution system, first contact means operable from a closed to an open condition in response to movement of said thermal element from said first position to said second position, second contact means operable from an open condition to a closed condition in response to movement of said thermal element from said first position to said second position, latching means effective for the duration of said condition of said network distribution system for holding said second contact means in a closed condition following an operation of said thermal element, and circuit breaker control means responsive to the series condition of said first and second contact means.

11. In a network distribution system, a feeder circuit, a network circuit, a circuit breaker for operatively connecting and disconnecting said circuits, and means for controlling said circuit breaker including closing means responsive to a first predetermined condition of said network distribution system for closing said circuit breaker, tripping means responsive to a second predetermined condition of said network distribution system for tripping said circuit breaker, and time delay means always effective both for delaying each closing operation of said circuit breaker by said closing means and for delaying each tripping operation of said circuit breaker.

12. In a network distribution system, a feeder circuit, a network circuit, a circuit breaker for operatively connecting and disconnecting said circuits, and means for controlling said circuit breaker including closing means responsive to a first predetermined condition of said network distribution system for closing said circuit breaker, tripping means responsive to a second predetermined condition of said network distribution system for tripping said circuit breaker, time delay means effective both for delaying a closing operation of said circuit breaker and for delaying a tripping operation of said circuit breaker, and means responsive to a predetermined condition of said network distribution system for rendering said time delay means ineffective to delay an operation of said circuit breaker.

13. In a network distribution system, a feeder circuit, a network circuit, a circuit breaker for operatively connecting and disconnecting said circuits, and means for controlling said circuit breaker including closing means responsive to a first predetermined condition of said network distribution system for closing said circuit breaker, tripping means responsive to a second predetermined condition of said network distribution system for tripping said circuit breaker, time delay means effective both for delaying a closing operation of said circuit breaker and for delaying a tripping operation of said circuit breaker, means responsive to a predetermined abnormal condition of said network distribution system for rendering said time delay means ineffective to delay a tripping operation of said circuit breaker, and means responsive to the energization of said network circuit for rendering said time delay means ineffective to delay a closing operation of said circuit breaker.

14. In a network distribution system, a feeder circuit, a network circuit, a circuit breaker for operatively connecting and disconnecting said circuits, and means for controlling said circuit breaker including closing means for said circuit breaker, tripping means for said circuit breaker, energizing means for said controlling means, said energizing means having a common portion effective for completing the energization for both said closing means and said tripping means, and time delay means for controlling the effectiveness of said common portion of said energizing means to interpose a time delay in each operation of said circuit breaker by said closing means and said tripping means.

15. In a network distribution system, a feeder circuit, a network circuit, a circuit breaker for operatively connecting and disconnecting said circuits, and means for controlling said circuit breaker including closing means for said circuit breaker, tripping means for said circuit breaker, energizing means for said controlling means, said energizing means having a common portion effective for completing the energization for both said closing means and said tripping means, time delay means for controlling the effectiveness of said common portion of said energizing means, and means responsive to the condition of said network distribution system for rendering said time delay means ineffective.

16. In a network distribution system, a feeder circuit, a network circuit, a circuit breaker for operatively connecting and disconnecting said circuits, and means for controlling said circuit breaker including closing means for said circuit breaker, tripping means for said circuit breaker, energizing means for said controlling means including a tripping circuit for said tripping means, a closing circuit for said closing means, and a common conductor selectively operable into conductive relationship with either said tripping circuit or said closing circuit for completing an energizing circuit for either said tripping means or said closing means, and time delay means responsive to the condition of said common conductor for delaying the energization of said tripping means and closing means.

17. In a network distribution system, a feeder circuit, a network circuit, a circuit breaker for operatively connecting and disconnecting said circuits, and means for controlling said circuit breaker including closing means for said circuit breaker, tripping means for said circuit breaker, energizing means for said controlling means including a tripping circuit for said tripping means, a closing circuit for said closing means, and a common conductor selectively operable into conductive relationship with either said tripping circuit or said closing circuit for completing an energizing circuit for either said tripping means or said closing means, time delay means responsive to the condition of said common conductor for delaying the energization of said tripping means and closing means, means responsive to an abnormal condition of said network distribution system for rendering said time delay means ineffective, and means responsive to the condition of energization of said network circuit for rendering said time delay means ineffective.

18. In a network distribution system, a feeder circuit, a network circuit, a circuit breaker for operatively connecting and disconnecting said circuits, and means for controlling said circuit breaker including closing means for said circuit breaker, tripping means for said circuit breaker, and energizing means for said controlling means including a relay having tripping contact means, closing contact means and common contact means, said relay being responsive to the condition of said network distribution system for selectively establishing a conductive path between said common contact means and either said tripping contact means or said closing contact means, a tripping circuit associated with said tripping contact means for energizing said tripping means, a closing circuit associated with said closing contact means for energizing said closing means, means operable through said common contact means for selectively energizing either said tripping circuit or said closing circuit, and time delay means responsive to the condition of said common contact means for delaying the energization of said tripping means and said closing means.

19. In a network distribution system, a feeder circuit, a network circuit, a circuit breaker for operatively connecting and disconnecting said circuits, and means for controlling said circuit breaker including closing means for said circuit breaker, tripping means for said circuit breaker, and energizing means for said controlling means including a relay having tripping contact means, closing contact means and common contact means, said relay being responsive to the condition of said network distribution system for selectively establishing a conductive path between said common contact means and either said tripping contact means or said closing contact means, a tripping circuit associated with said tripping contact means for energizing said tripping means, a closing circuit associated with said closing contact means for energizing said closing means, means operable through said common contact means for selectively energizing either said tripping circuit or said closing circuit, time delay means responsive to the energization of said common contact means for delaying the energization of said tripping means and said closing means, means responsive to an abnormal condition of said feeder circuit for preventing said time delay means from delaying a tripping operation of said circuit breaker, and means responsive to a deenergized condition of said network circuit for preventing said time delay means from delaying a closing operation of said circuit breaker.

MYRON A. BOSTWICK.